United States Patent
Evans

(10) Patent No.: US 7,854,425 B2
(45) Date of Patent: Dec. 21, 2010

(54) BELLEVILLE SPRING GUIDE SYSTEM

(75) Inventor: Robert W. Evans, Montgomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1215 days.

(21) Appl. No.: 11/316,133

(22) Filed: Dec. 21, 2005

(65) Prior Publication Data
US 2007/0138720 A1    Jun. 21, 2007

(51) Int. Cl.
*F16F 1/32*    (2006.01)
(52) U.S. Cl. ..................................... 267/162
(58) Field of Classification Search ................ 267/162, 267/161
See application file for complete search history.

(56) References Cited

U.S. PATENT DOCUMENTS

| | | | |
|---|---|---|---|
| 1,826,597 A * | 10/1931 | Brecht | ........................ 267/162 |
| 2,768,844 A * | 10/1956 | Schadeberg | ............ 285/148.18 |
| 2,939,663 A | 6/1960 | Suozzo | |
| 3,029,071 A | 4/1962 | Wells | |
| 3,258,029 A | 6/1966 | Parrino | |
| 3,261,598 A | 7/1966 | Jones | |
| 3,375,000 A | 3/1968 | Seamands et al. | |
| 3,394,631 A | 7/1968 | Thompson | |
| 3,430,942 A | 3/1969 | Webb | |
| 3,444,342 A | 5/1969 | Kenyon et al. | |
| 3,873,079 A | 3/1975 | Kuus | |
| 3,891,033 A | 6/1975 | Scott | |
| 4,168,101 A | 9/1979 | DiGrande | |
| 4,621,568 A | 11/1986 | Gailey | |
| 5,081,328 A | 1/1992 | Friend et al. | |
| 6,887,279 B2 | 5/2005 | Phillips et al. | |

OTHER PUBLICATIONS

James R. Easterday, P.E., "The Kolene QPQ Process", Kolene Corporation website, 1996, pp. 1 thru 6.
USPTO Search, Hits 1 through 20, Search terms: disc spring and hysteresis, Aug. 23, 2005.
USPTO Search, Hits 1 through 17, Search terms: disk spring and hysteresis, Aug. 23, 2005.
USPTO Search, Hits 1 through 26, Search terms: Belleville spring and hysteresis, Aug. 23, 2005.
Lexis Search, Search terms: disk or disc w/5 spring w/25 hysteresis, Aug. 24, 2005.
Lexis Search, Search terms: Bellville or Belleville w/5spring w/25 hysteresis, Aug. 23, 2005.
Belleville Springs Ltd website search.
Key Bellevilles, Inc. website search.
Mubea Disc Springs Manual, Mubea Tellerfedern und Spannelemente GmbH, Im Kirdorf, 57567 Daaden, Pages—"Table of Contents"; 23 thru 30; and 38 thru 61.

* cited by examiner

*Primary Examiner*—Bradley T King
(74) *Attorney, Agent, or Firm*—Conley Rose, P.C.

(57) ABSTRACT

Apparatus and method are provided for decreasing frictional effects in stacks of Belleville springs and limiting deflection of the springs. In one embodiment, carriers for springs overlap and minimize the effects of lateral forces that are developed as springs in a stack are loaded. Carriers may be used on mandrel guides, in cylindrical guides or without a guide. In other embodiments, maximum load and defection of springs may be provided by the spring carriers.

16 Claims, 12 Drawing Sheets

US 7,854,425 B2

BELLEVILLE SPRING GUIDE SYSTEM

BACKGROUND OF THE INVENTION

1. Field of the Invention

The present invention relates generally to Belleville or disc springs. More particularly, apparatus and method are provided for decreasing friction and hysteresis effects in operation of the springs.

2. Background of the Invention

Belleville Springs are conical shaped circular springs that were patented in 1867 by Julian Belleville. They are also called "Belleville Washers," because in plan view they have the shape of a washer. They are also called "disk springs." Subsequent improvements have advanced this simple spring device to a sophisticated energy storage system that is used in many mechanical systems today. The springs are designed to be loaded in the direction perpendicular to the washer, i.e., by compressing the cone, and they may be loaded statically or dynamically. Disk springs are used, for example, in brakes, clutches, valves, shock absorbers, actuators, loading of flange joints, and in a variety of mechanical equipment for use in wells, such as jars, accelerators, shock subs, clutches, drilling motors and other equipment.

Belleville springs (disk springs) are available in a wide range of sizes, from about 8 millimeters to about 800 or more millimeters. When multiple springs are used together, they are usually used with a mandrel inside the springs or a cylindrical surface in contact with the outside periphery of the springs to serve as a guide, so they can be maintained in alignment when a load is applied. They may be delivered pre-assembled in stacks with the guiding device. Combinations of disks having different spring characteristics may be combined in a stack to produce a wide variety of load-deflection curves. The disks may be selected to provide specific load-deflection diagrams. Individual disks may be externally slotted or internally slotted to produce a load-deflection characteristic for specific applications. The disc blanks may be manufactured by stamping, fine blanking or plasma arc/flame cutting and they may receive a variety of metallurgical treatments.

Design equations are readily available for any combinations of disk springs. Stacks may be made up of springs in parallel or series configuration. In the parallel configuration, springs are arranged in parallel, i.e., with the cone in the same direction. In the series configuration, the external circumference of springs is in contact with that of an adjoining spring and the internal circumference is likewise in contact with that of an adjoining spring. It is possible to generate characteristic curves for stacks of springs by combining parallel stacks with a selected number of disc springs and series configurations of other springs. A manual published by Mubea Tellerfedern und Spannelemente GmbH of Daaden, Germany, provides information on design theory and properties of Belleville springs and stacks of Belleville springs.

In addition to disc spring stacks having a mandrel or cylinder as a guide, self-centering disc spring stacks are available. These may be centered by balls and grooves on the inner and outer diameter. The self-centering is primarily used on stacks of large disc springs. Wire-centered disc spring stacks have also been used, substituting wire segments for the steel balls. Friction is slightly higher with this type centering. A T-ring or retaining ring may also be used for centering disc spring stacks.

It has long been known that friction is important during operation of Belleville springs. The friction may arise between individual springs, between the springs and the guide element, and at the edges of the spring where load is applied. This friction results in a variation between the calculated characteristic load curve and an actual load curve. The force required to compress the springs is greater than the force recovered when the springs are relaxed, which means that a load-deflection diagram exhibits hysteresis. The area within a hysteresis loop is indicative of the effect of friction on operation of the spring system.

One of the sources of friction in operation of a Belleville or disc spring is the friction between the central and outside peripheries of the spring and the load surfaces coming in contact with those faces. U.S. Pat. No. 3,261,598 discloses mechanisms to minimize the frictional losses from radial movement of a Belleville washer between two flat surfaces. Spring supports that may be deflected with minimal force in a radial direction are employed. The spring supports may be applied at both the central opening and the outside periphery of a Belleville spring.

U.S. Pat. No. 3,375,000 addresses a different source of frictional losses in stacks of Belleville springs. It discloses a Belleville spring assembly for reducing surface friction between springs that are mounted in a parallel stacked array. A bearing element between the inner and outer edges of adjacent discs is employed. The patent states that stacked arrays of parallel discs in abutting relationship produce undesirable hysteresis losses as a consequence of friction imposed by contacting surfaces through flexure of the washers and associated parts.

U.S. Pat. No. 3,873,079 discloses a number of Belleville spring discs held in coaxial relation by inner and outside split retainer rings that are expansible by the springs when the springs are deflected axially and spread at their periphery. The retainer rings have v-shaped grooves for receiving the edges of the springs while affording a clearance space to minimize friction during deflection of the springs.

U.S. Pat. No. 5,081,328 describes one of the wide varieties of applications of Belleville springs—the use in a switch. The patent also describes the limitations of Belleville springs because of frictional effects, explaining that the motion required to convert fluid pressure to mechanical work results in Belleville springs bending, sliding, scraping and plowing at the inside diameter or outside diameter of the springs. The result of friction increases hysteresis and causes an increase in a switch's "deadband" (the difference between the point of operation and the point that it returns to its pre-operated state). The '328 patent discloses avoiding the difficulty of the Belleville springs (because of frictional effects) by using a pressure-sensing negative rate membrane.

In stacks of springs guided by a rod or mandrel, springs may be designed with a special inner edge contour in an attempt to minimize friction between the guide rod and the disc springs. However, deviations in geometry of individual disc springs result in an uneven transmission of load from one spring to the next in a stack. This results in forces tending to cause a lateral displacement of the springs, or a buckling of the stack, causing the springs to be pressed with force against the guide element. This lateral force is similar to a buckling force observed in a rod or tube with ends under compression. Thus, there is a need for apparatus and method to minimize the net frictional effects arising from lateral forces or buckling. This will reduce the overall effect of friction on operation of stacks of Belleville springs, whether the springs are guided by a mandrel or a sleeve.

When Belleville springs are used in downhole jars, for example, friction force on the springs prevents a constant triggering load of the jar. This is discussed in Pub. No. U.S.

2005/0092495, at page 6, col. 1. The referenced publication is hereby incorporated by reference herein in its entirety.

It is sometimes necessary to include a stroke-limiter with a Belleville spring. For example, if the spring is deflected beyond a certain limit, it may reverse direction, or excess deflection may cause permanent change in spring characteristics. Therefore, there is a need for apparatus to prevent excessive deflection of a Belleville spring along with the reduction of the effects of friction on operation of stacks of Belleville springs.

SUMMARY OF INVENTION

Apparatus is provided for reducing friction during operation of a stack of Belleville springs. The apparatus reduces lateral force on the springs in a stack (two or more springs) by providing a plurality of slidably coupled spring carriers between the springs and their guide mechanism. Apparatus is also provided for limiting deflection of Belleville springs. In other embodiments, no guide is provided and initial overlapping of spring carriers acts as a guide.

DETAILED DESCRIPTION

Figure 1A:
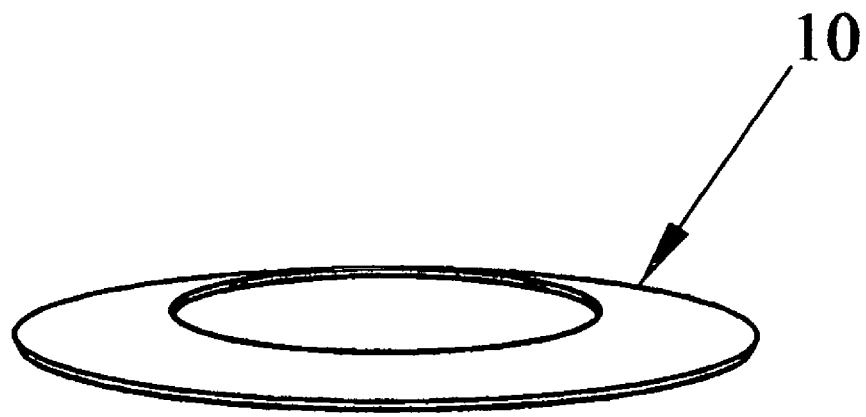
FIG. 1A is a perspective view of a Belleville spring.
Figure 1B:
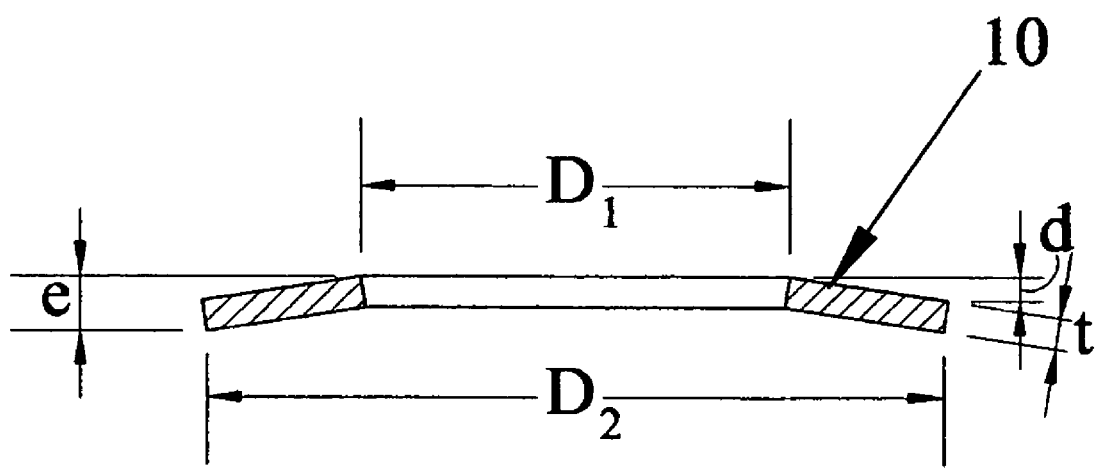
FIG. 1B identifies dimensions of a Belleville spring in a cross-sectional view.

FIG. 1A shows a perspective view of a Belleville Washer. The washers are manufactured using materials, such as alloy steels, to meet specific material requirements. They should exhibit good fatigue life and minimum relaxation. A high alloy content material is commonly used as the spring steel. FIG. 1B identifies dimensions of Belleville Springs commonly used. Spring 10 is shown in FIG. 1A and FIG. 1B. $D_1$ is the diameter of the opening, $D_2$ is the external diameter of the spring, t is the thickness of the spring material, d is the maximum deflection of the spring when it is compressed, and e is the overall thickness of the spring in the uncompressed state. d=e−t. The spring may contain special properties for corrosion or other properties and may be coated with a number of different materials such as phosphate, galvanizing, mechanical zinc plating and electroless nickel plating. It may also be coated with the coating to minimize friction, which is discussed further below.

Figure 2A:
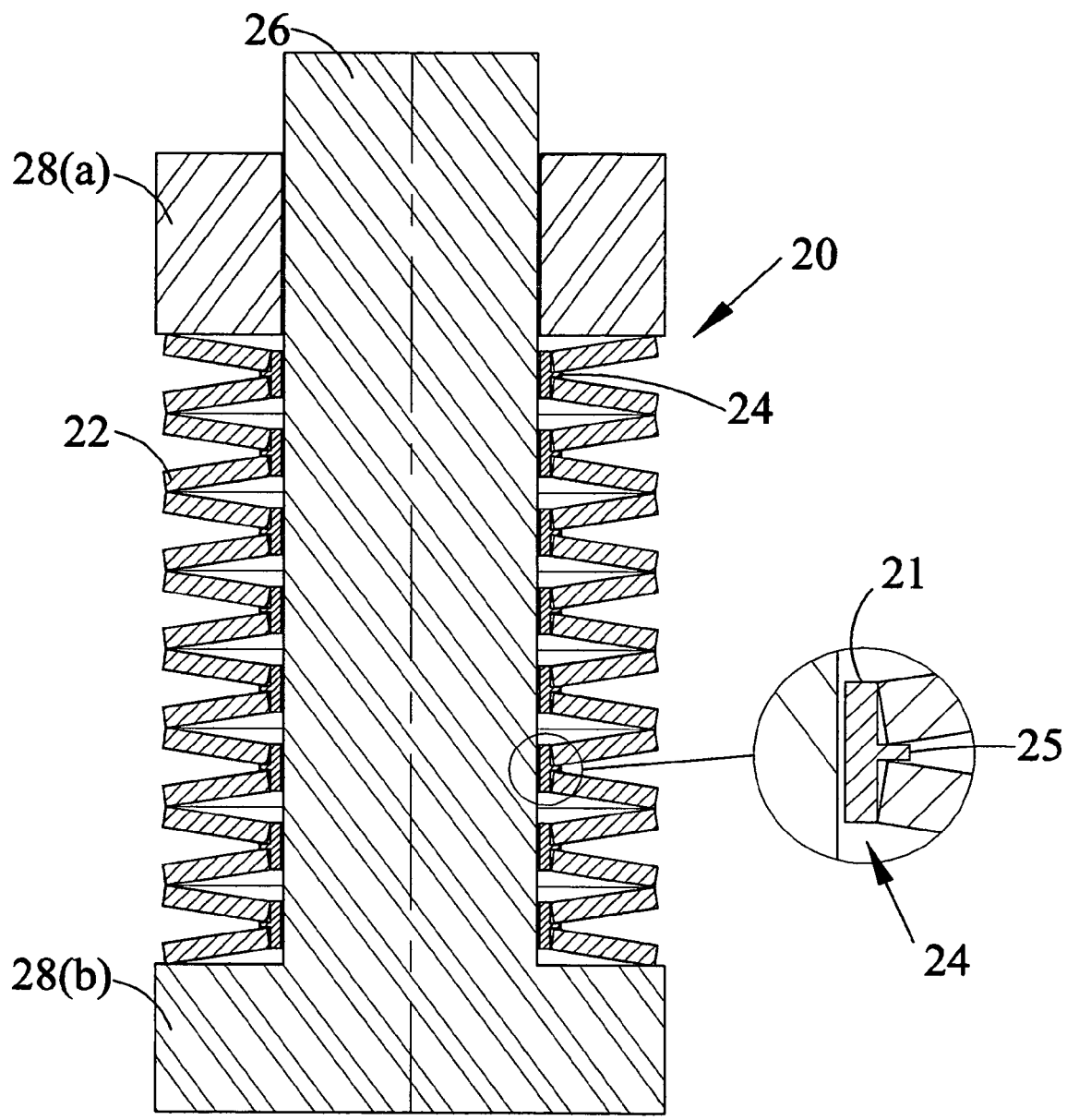
FIG. 2A is a cross-sectional view of a stack of Belleville springs in series in an uncompressed state on spring carriers and a mandrel guide.
Figure 2B:
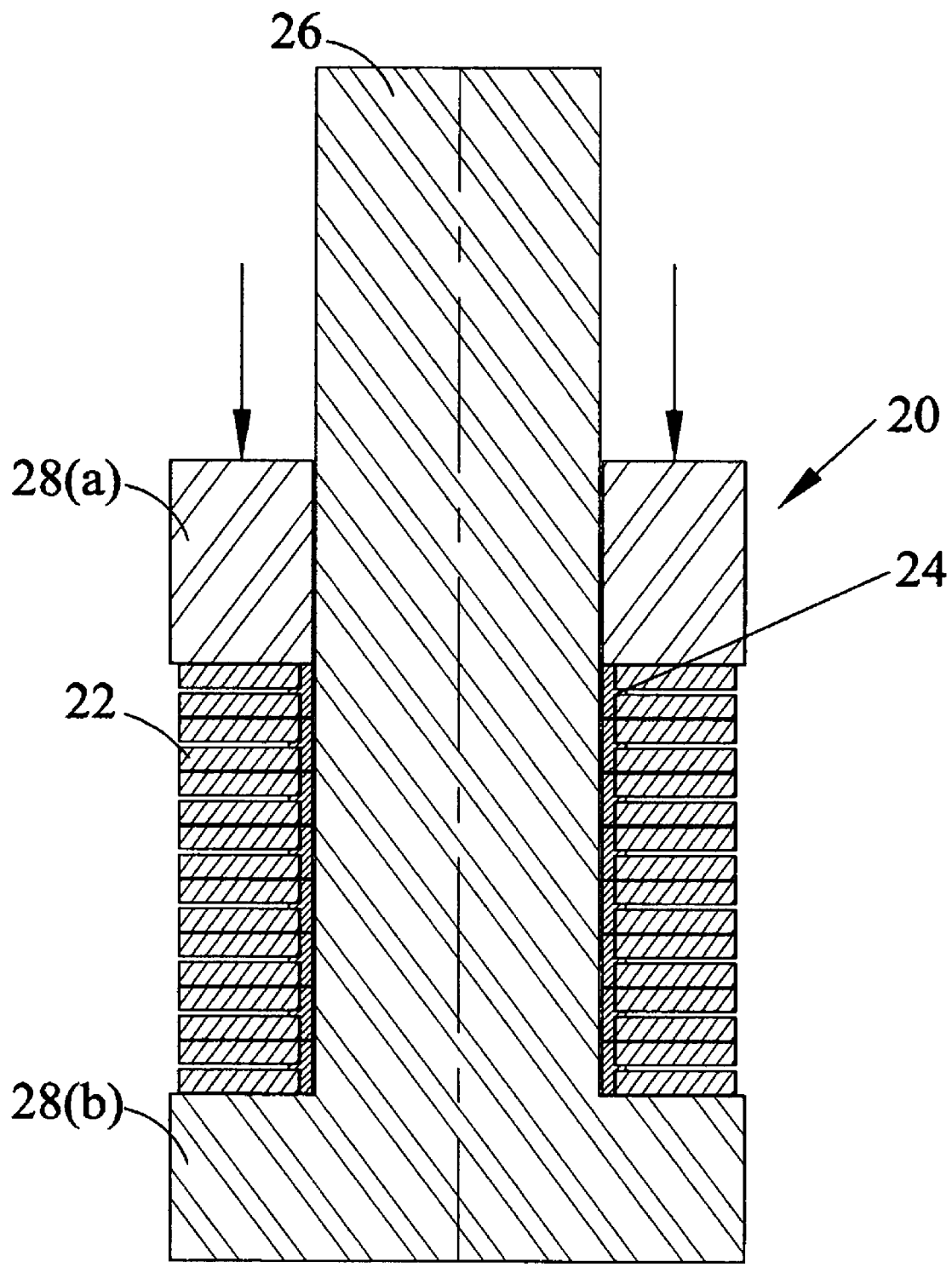
FIG. 2B is a cross-sectional view of the stack in a compressed state.
Figure 2C:
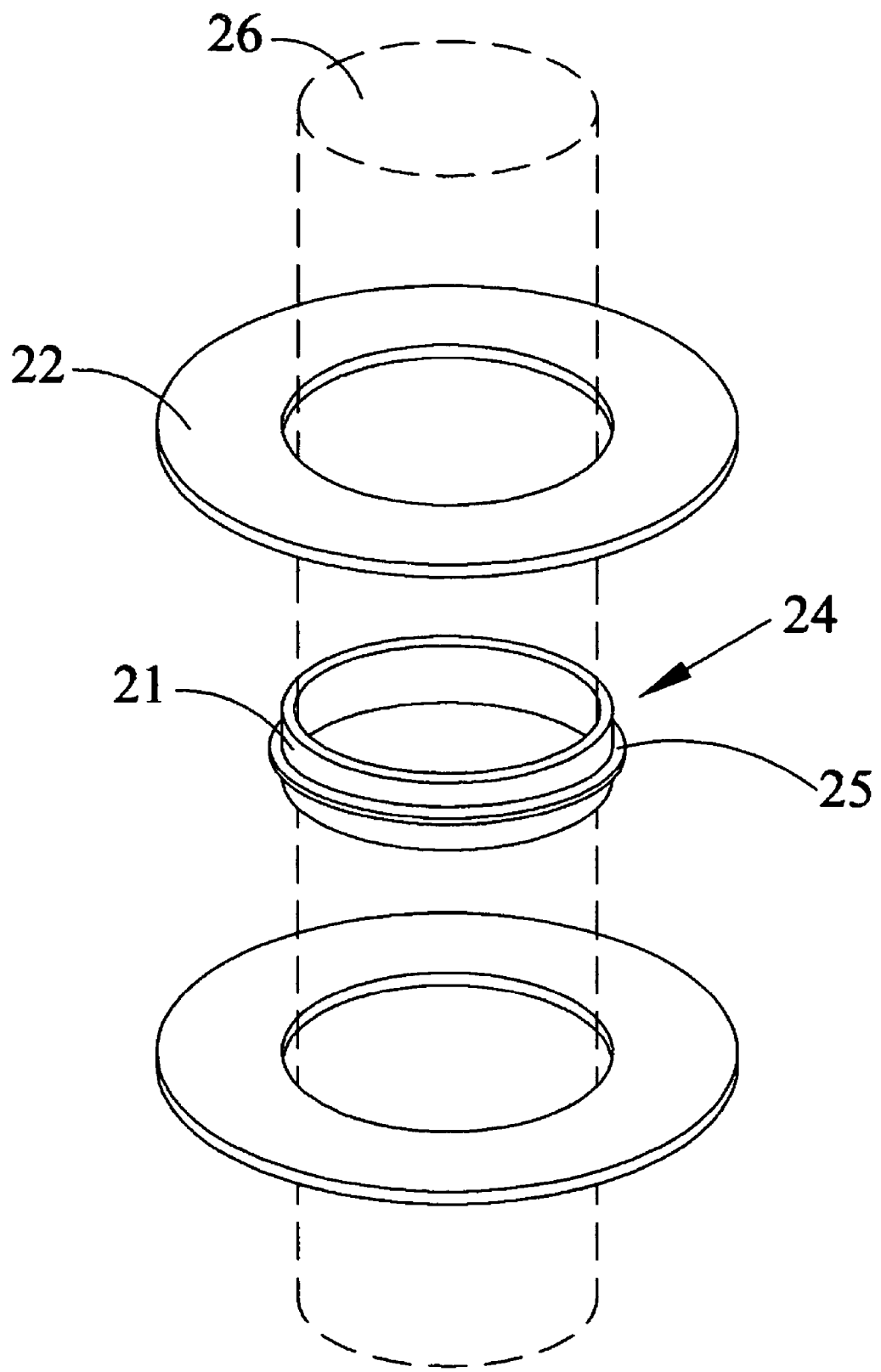
FIG. 2C is a perspective view of springs of the stack and a spring carrier on a mandrel guide.

Referring to FIG. 2A, spring stack 20 is shown in cross section, including springs 22 in series configuration on spring carriers 24, which are guided by mandrel 26. Forces are applied to the springs through load ring 28(a) and load base 28(b). Referring to the inset of FIG. 2A, spring carrier 24 is formed by sleeve 21 and circumferential flange 25. FIG. 2B depicts spring stack 20 in the state of maximum compression. Springs 22 have been deflected to the point where the cone is collapsed (i.e., deflected by the distance "d" of FIG. 1B). Spring carriers 24 are in contact on mandrel 26. FIG. 2C shows a perspective view of the washers and spring carrier 24 of FIGS. 2A and 2B. Carrier 24 is formed from sleeve 21 and circumferential flange 25 on the outside surface of the sleeve. Flange 25 allows the washers to be spaced at a selected location on carrier 24, normally at an equal distance from each end of the sleeve. Spring carrier 24 is adapted to fit slidably on mandrel 26. The outside diameter of spring carrier 24 is adapted to fit in the inside diameter ($D_1$ of FIG. 1B) of Belleville Spring 22.

Figure 3A:
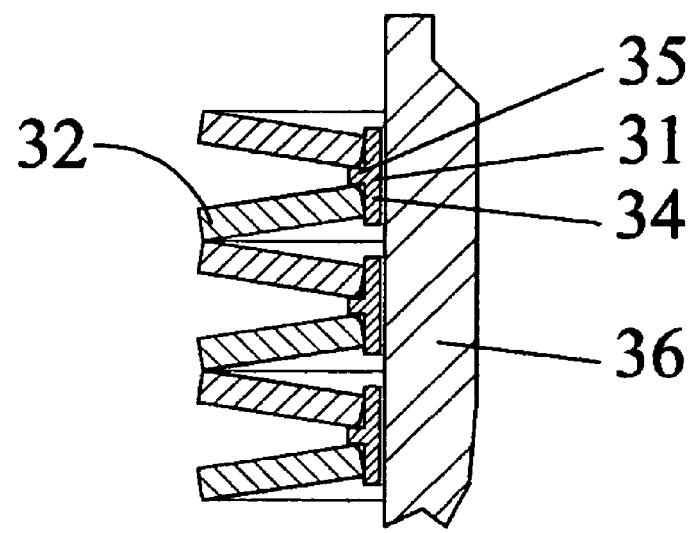
FIG. 3A is a partial cross-sectional view of a stack of Belleville springs in series in an uncompressed state on stroke-limiting spring carriers and a mandrel guide.
Figure 3B:
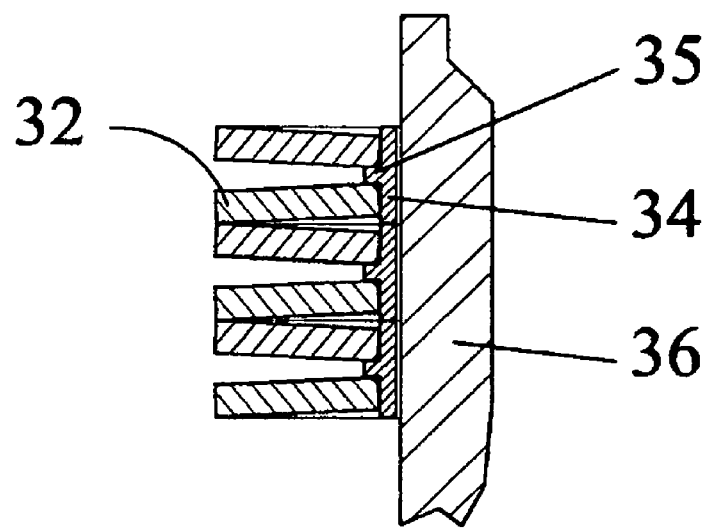
FIG. 3B is a partial cross-sectional view of the stack in a compressed state.

Referring to FIG. 3A, Belleville Springs 32 on one side of mandrel 36 are shown in a partial cross-sectional view. Spring carrier 34 is placed between mandrel 36 and springs 32. Spring carrier 34 includes sleeve 31 and circumferential flange 35. In FIG. 3A, springs 32 are either in a relaxed state or in a compressed state less than maximum compression. FIG. 3B shows spring 32 in the state of maximum compression allowed when springs are employed on spring carrier 34. Spring carrier 34 has an axial dimension, as measured from flange 34 to an end of sleeve 31, greater than the maximum deflection ("d" of FIG. 1B) of spring 32. When the apparatus is deployed on mandrel 36 and load is applied, spring carrier 34 may serve to limit the deflection and the load applied to springs 32. This load-limiting feature may be selected over a broad range of load from zero deflection or the relaxed state to maximum deflection of the springs. The width of circumferential flange 35 may also be selected to maintain an optimum spacing of springs 32. Flange 35 serves primarily to control the placement of springs 32 on spring carrier 34. It preferably has enough width to provide the needed mechanical strength of the flange.

Figure 4A:
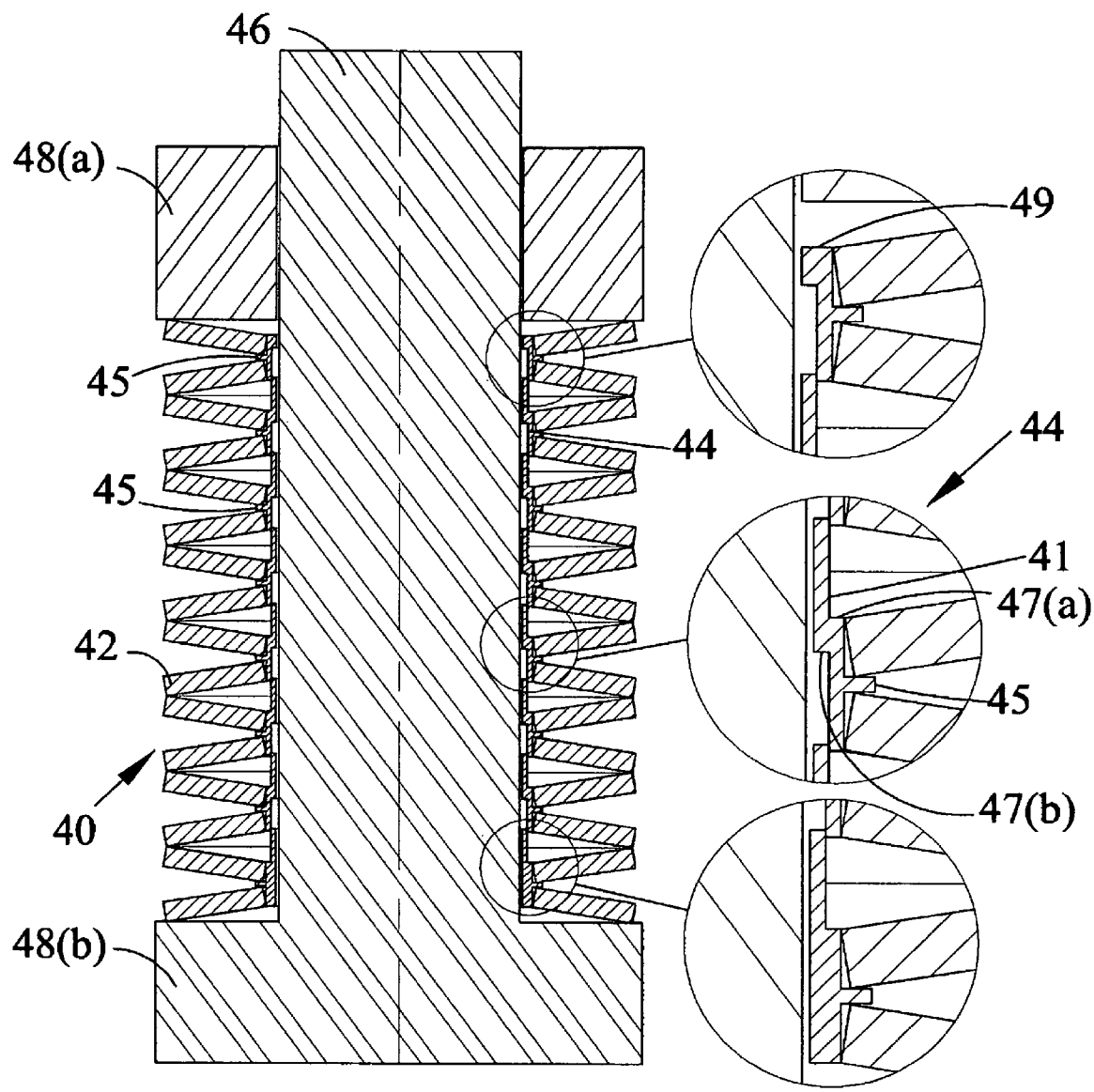
FIG. 4A is a cross-sectional view of a stack of Belleville springs in series in an uncompressed state on overlapping spring carriers and a mandrel guide.

Referring to FIG. 4A, springs 42 are deployed on mandrel 46 using spring carriers 44. As seen more clearly in the center inset, spring carrier 44 is made up of sleeve 41. The smaller diameter of the inside surface of sleeve 41 is sized to fit slidably over mandrel 46 and the larger diameter of the outside surface of sleeve 41 is sized to fit in the inside diameter of springs 42. Spring carrier 44 has inside and outside surfaces of different diameter on each side of shoulders 47(a) and 47(b), which are placed at selected locations on the outside surface and inside surface, respectively, of carrier 44. Shoulder 47(a) separates a larger and small diameter on the outside surface and shoulder 47(b) separates a larger and smaller diameter on the inside surface of sleeve 41. Circumferential flange 45 may be used to facilitate placing springs 42 on carrier 44. Load ring 48(a) and load base 48(b) may be used to apply load to stack 40.

The outside diameter of one segment of carrier 44 is selected to fit in the inside diameter of another segment of carrier 44. The carriers are disposed on mandrel 46 such that adjacent carriers overlap and thereby decrease lateral or bucking loads on mandrel 46 as springs 42 are compressed. Overlapping of adjacent carriers creates rigidity to the stack of carriers and provides significant friction reduction in stack 40 as it is compressed and decompressed. A hysteresis curve for the compression and decompression will have significantly smaller area in the presence of overlapping carriers 44 than in the absence of such carriers. Carriers 44 may be truncated so that an end carrier may allow the end spring to compress against load ring 48(a) or load base block 48(b). Truncated carriers 49 (upper inset and lower inset) illustrate a preferred configuration of a spring carrier to be placed at the end of a stack.

Figure 4B:
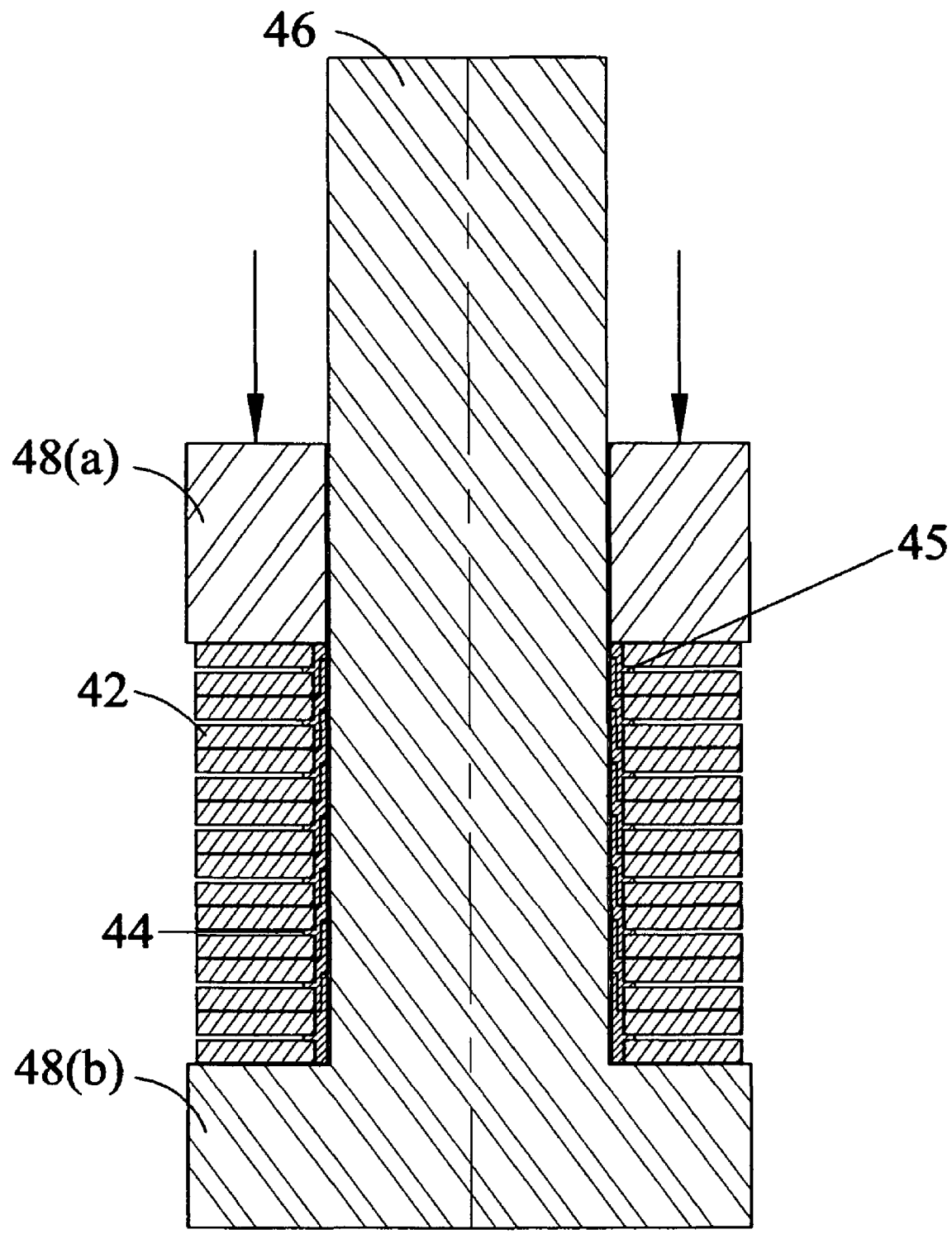
FIG. 4B is a cross-sectional view of the stack in a compressed state.

In FIG. 4B compressive load has been applied to deflect springs 42 to the point where adjacent springs carriers 44 are completely interlocked or overlapping and springs 42 have reached maximum deflection. Spring carriers 44 have moved along their axis as each spring has been deflected a distance equal to the maximum deflection ("d" of FIG. 1B). As discussed above with respect to FIGS. 3A and 3B, the distance from an end of sleeve 41 to shoulder 47(a) or 47(b) may be less than the maximum deflection of spring 42. In this case, when the apparatus is deployed on mandrel 46 and load is applied, then spring carrier 44 may serve to limit the deflection and the load applied to springs 42. This load-limiting feature may be selected over a broad range of load from zero deflection or the relaxed state to maximum deflection of the springs.

Figure 4C:
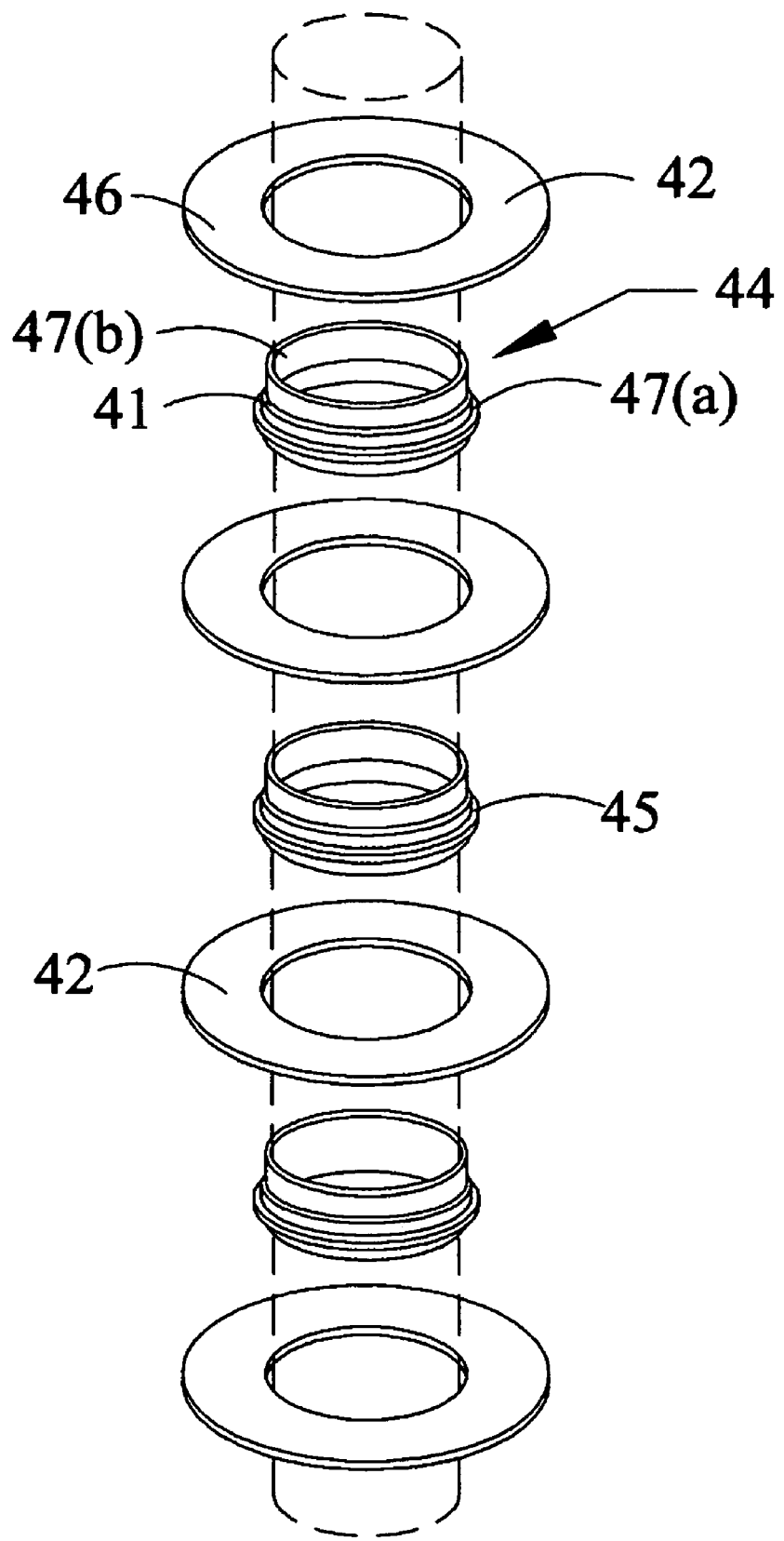
FIG. 4C is a perspective view of springs of the stack and spring carriers on a mandrel guide.

Referring to FIG. 4C, a perspective view is shown of springs 42 on carriers 44 and mandrel 46. Sleeve 41 has shoulder 47(a) on the outside surface and shoulder 47(b) on the inside surface. Circumferential flange 45 is placed at a selected position, preferably in the center of the larger diameter surface on the outside surface of sleeve 41. Shoulders 47(a) and 47(b) may be placed equal distances from the opposite ends of sleeve 41. Alternatively, the shoulders may be placed at different distances from the opposite ends of sleeve 41. These distances will be shown in more detail in FIG. 6A.

Figure 5:
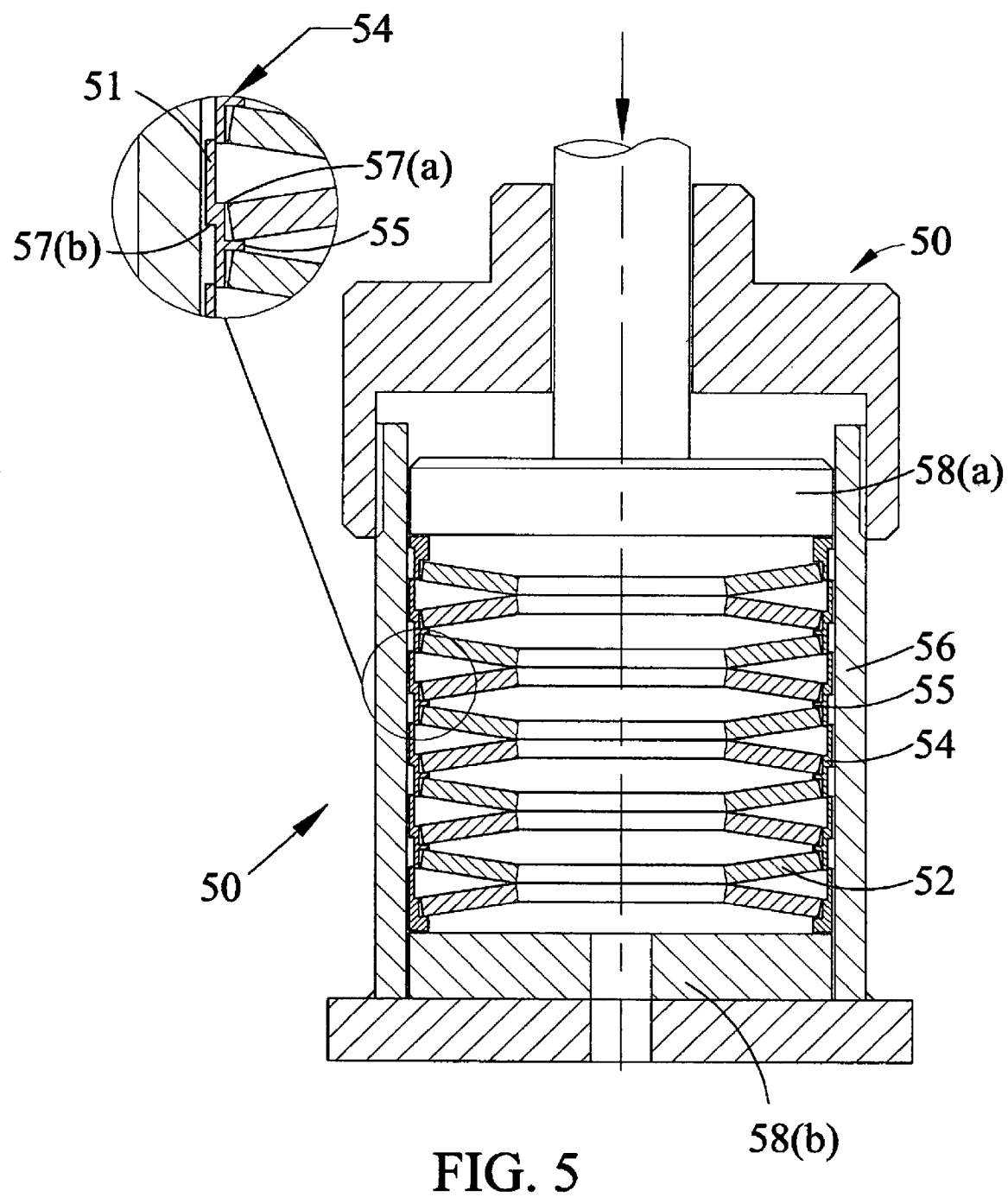
FIG. 5 is a cross-sectional view of a stack of Belleville springs in series in an uncompressed state in overlapping spring carriers in a cylinder guide.

Referring to FIG. 5 spring stack 50 guided by cylinder 56 is shown. Springs 52 are sized to fit the inside diameter of spring carriers 54. The larger outside diameter of spring carrier 54 is sized to slidably fit inside cylinder 56. Spring carriers 54 are made of sleeve 51 (see inset) and have circumferential ledge 55 on the smaller diameter area of the inside surface. Carriers 54 also have shoulders 57(a) and 57(b) at selected locations, similar to the carriers to be placed over a mandrel as shown in FIG. 4A. Load blocks 58(a) and 58(b) transmit force to the stack of springs 52.

Figure 6A:
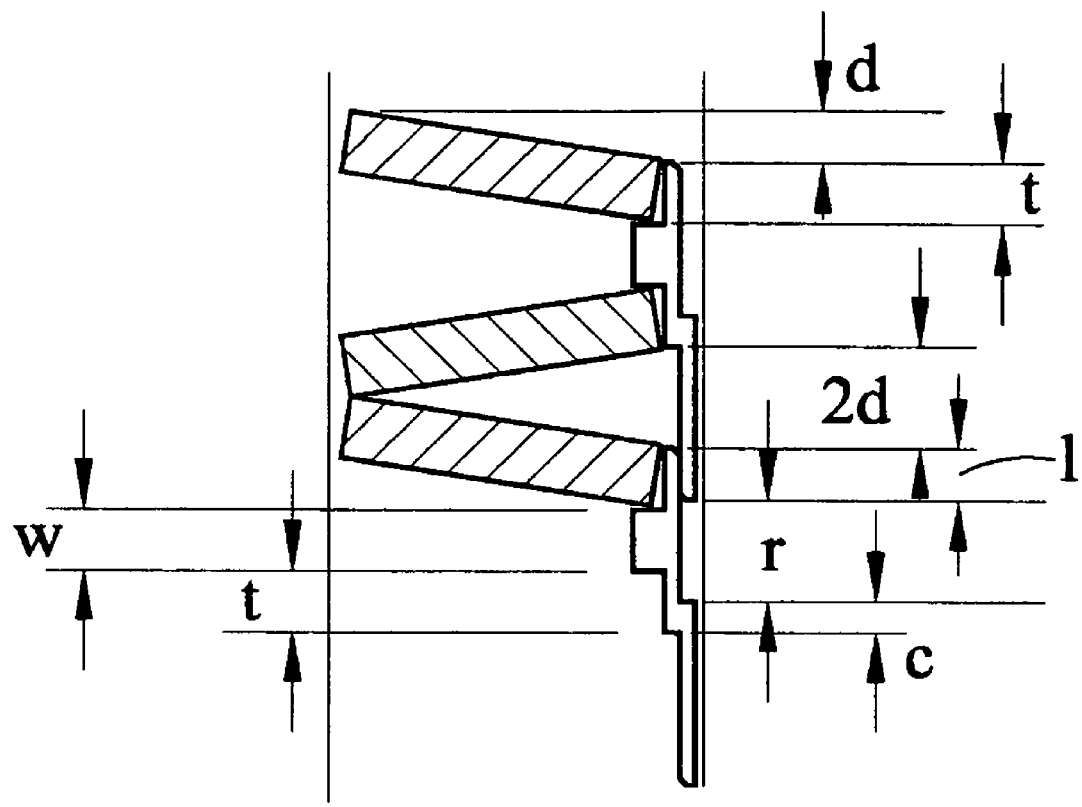
FIG. 6A shows dimensions of Belleville springs in series in an uncompressed state on overlapping spring carriers.

Overlapping spring carriers for use inside a cylinder guide or on a mandrel may be designed to provide complete interlocking or overlapping when springs reach maximum deflection or may be designed to provide load-limiting capabilities by selection of axial dimensions. FIG. 6A illustrates dimensions of overlapping carriers. As can be noted in the figure, for the carriers to be moved with the springs to maximum spring deflection (d) when the carriers are completely overlapping or interlocked, dimensions may be selected such that:

$$2t+w=c+l+r,\qquad\text{(Eq. 1)}$$

where t is spring thickness, w is width of the circumferential ledge, c is the distance between the inside and outside shoulders, l is the overlap of the carriers at the initial deflection of the springs and r is the remaining overlap from the initial deflection of the springs. If we dimension the spring carrier so that r=2d, then:

$$2t+w=c+l+2d.\qquad\text{(Eq. 2)}$$

Figure 6B:
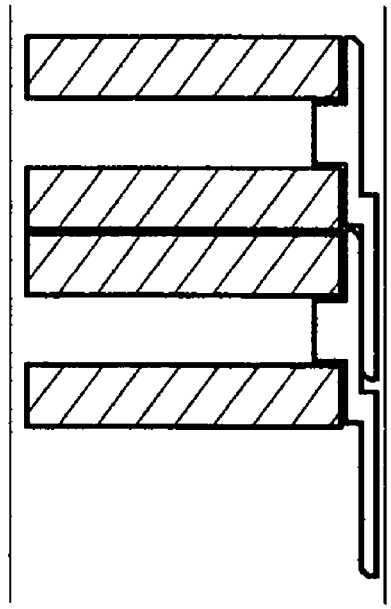
FIG. 6B shows the same springs in a compressed state.

The carriers then would move from the position shown in FIG. 6A to that shown in FIG. 6B (completely overlapping) if $$w=c+l+2(d-t).\qquad\text{(Eq. 3)}$$

d and t are spring properties that will be supplied by the manufacturer of the selected spring. c and l are design options for the carriers, which will determine the value of w if the springs are to reach maximum deflection when the carriers are completely interlocked. If load-limiting of the springs is to be provided by the carriers, the value of r (along the inside surface) under no-load conditions may be decreased, for example. Alternatively, dimensions of the carriers may be adjusted along the outside surface.

Preferably, the spring carriers disclosed herein are coated with an anti-friction coating. Many such coatings are available. A suitable coating is provided by The Kolene QPQ Process, which is a product of Kolene Corporation. Another suitable process is the Armorall process. Other known friction-reducing coatings, polymers, oils or additives may be used.

Figure 7A:
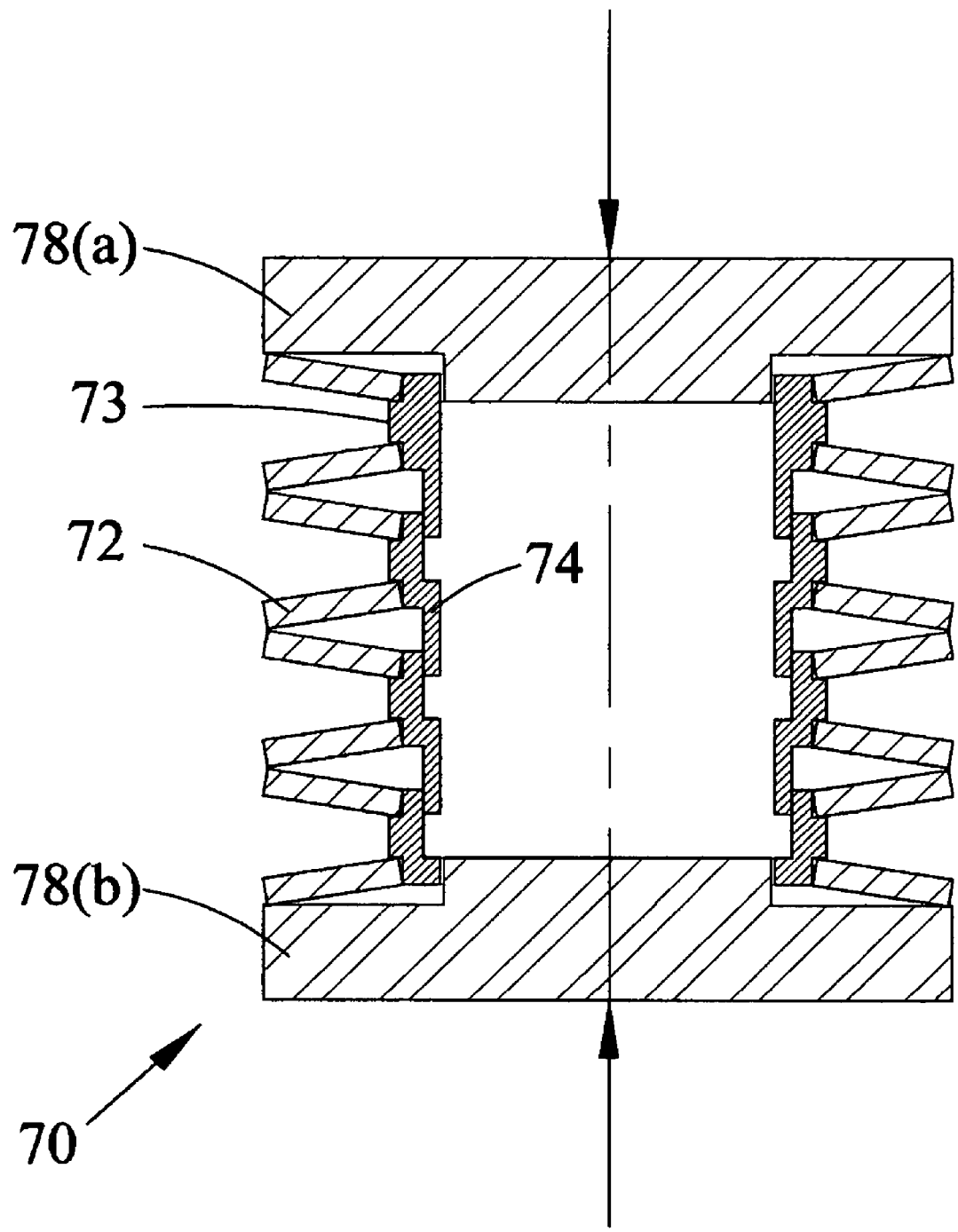
FIG. 7A shows a cross-sectional view of a stack of Belleville springs in series in an uncompressed state on overlapping spring carriers.
Figure 7B:
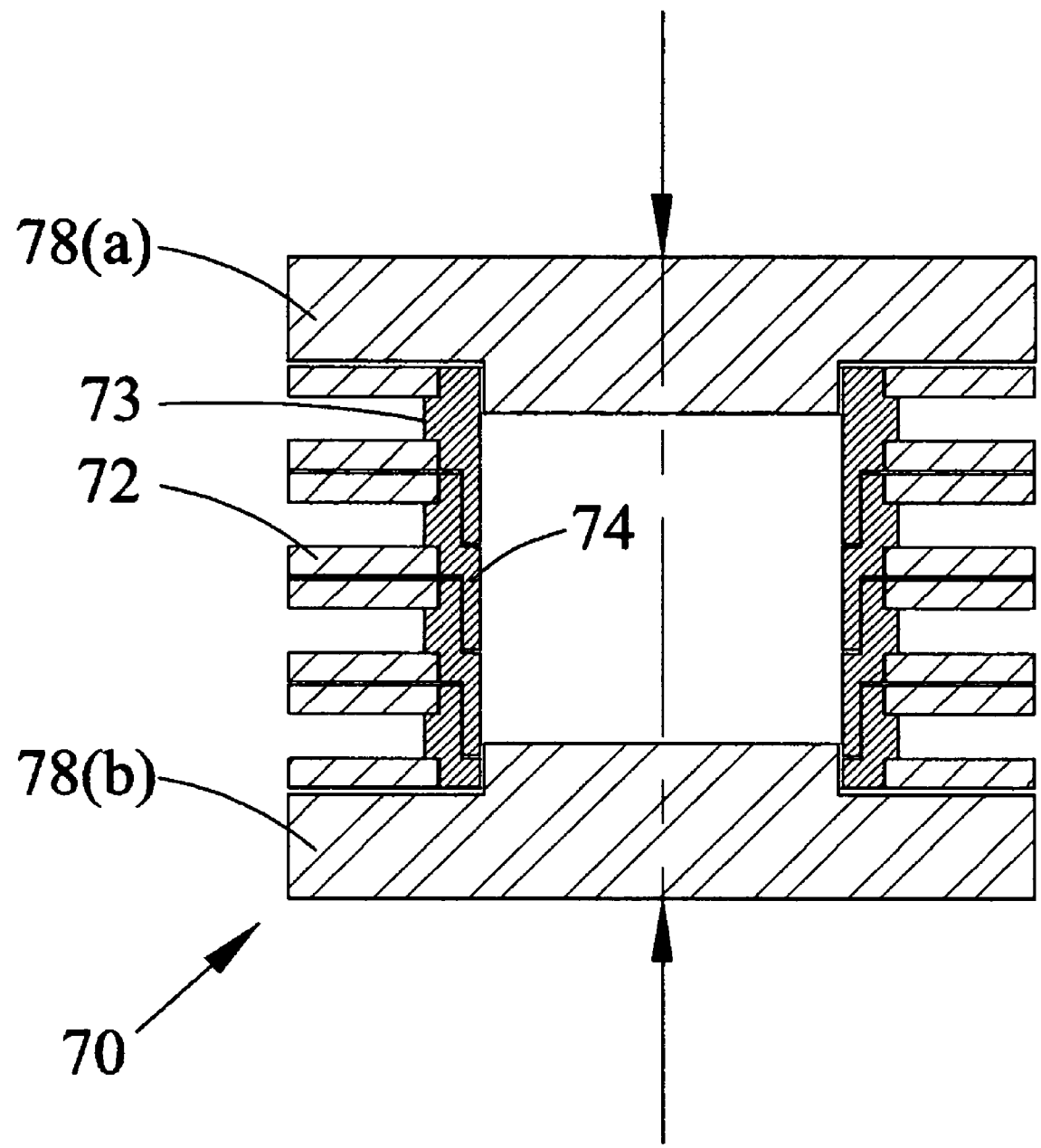
FIG. 7B shows the stack in a compressed state.

Embodiments disclosed heretofore employed a guide for the springs, either a mandrel or a cylinder. In other embodiments, a guide is not employed and the carriers are placed such that overlapping of adjacent carriers is sufficient to form a rigid structure that prevents sidewise movement of springs or buckling of a stack of springs. FIG. 7A illustrates such a stack, stack 70. Springs 72 are deployed on spring carriers 74. Note the absence of a mandrel, but adjacent carriers overlap sufficiently to provide a rigid structure, preventing buckling of the stack of springs. Overlapping may be provided by pre-loading springs or by adjusting carrier dimensions to allow sufficient overlapping a zero spring deflection. Carriers 74 have inside and outside surfaces of different diameter on each side of shoulders, as explained above for FIG. 4A. Circumferential flange 73 facilitates placing springs 72 on carriers 74. End pieces 78(a) and 78(b) may be used to apply force to the stack and to confine lateral movement of the end pieces of the carriers. FIG. 7B shows stack 70 in the totally compressed state. Stack 70 of FIG. 7 is similar to stack 40 of FIG. 4, except a mandrel guide is not present in FIG. 7. FIG. 5 shows a stack using a cylinder as a guide. Of course, a stack can be formed using the guides of FIG. 5 without a cylinder guide if carriers are initially overlapped. Such a stack may have the guide and spring configuration of FIG. 5 with load blocks at the ends of the stack and no cylinder guide outside.

Although the present disclosure has been described in detail, it should be understood that various changes, substitutions and alterations can be made thereto without departing from the scope and spirit of the invention as defined by the appended claims.

What I claim is:

1. A method for reducing hysteresis of a stack of Belleville springs, comprising:
   providing a mandrel guide;
   providing a plurality of the spring carriers for carrying a plurality of Belleville springs on a mandrel guide, the springs having a thickness of the material, an inside diameter and a maximum deflection of the springs in the compressed state, wherein each spring carrier comprises:

a sleeve having an outside surface, an inside surface, a first end and a second end;

a shoulder on the inside surface disposed at a selected distance from the first end and separating a larger diameter inside surface intersecting the first end and a smaller diameter inside surface intersecting the second end, the smaller diameter inside surface being adapted to fit the mandrel guide; and a shoulder on the outside surface disposed at a selected distance from the second end and separating a smaller diameter outside surface intersecting the second end, the smaller diameter outside surface intersecting the second end being adapted to fit slidably the larger diameter inside surface of an adjacent sleeve intersecting the first end, and a larger diameter outside surface intersecting the first end, the larger diameter outside surface having a circumferential flange thereon, the flange being disposed at a selected distance from the first end, the larger diameter outside surface having a diameter adapted to fit the inside diameter of the Belleville springs; and placing the Belleville springs adapted to fit the spring carriers on the spring carriers and placing the spring carriers on the mandrel guide so as to form the stack of Belleville springs.

2. The method of claim 1 wherein the selected distance from the first end to the shoulder on the inside surface of each spring carrier and the selected distance from the second end to the shoulder on the outside surface of each spring carrier are selected such that adjacent sleeves are approximately completely overlapping when the springs are at maximum deflection in the compressed state.

3. The method of claim 1 wherein the width of the circumferential flange on the outside surface (w) of each spring carrier is approximately equal to c+l+2(d−t), where c is the axial distance between the shoulder on the outside surface and the shoulder on the inside surface, l is the initial overlap of adjacent sleeves, d is the maximum deflection of the springs and t is the thickness of the material of the springs.

4. The method of claim 1 wherein the selected distance from the first end to the shoulder on the inside surface of each spring carrier and the selected distance from the second end to the shoulder on the outside surface of each spring carrier are selected such that adjacent sleeves are completely overlapping when the spring deflection is less than the maximum deflection of the springs.

5. The method of claim 1 wherein the selected distance from the first end to the shoulder on the outside surface of each spring carrier is adjusted such that adjacent sleeves are completely overlapping at the shoulder on the outside surface when a selected spring deflection is less than the maximum deflection.

6. The method of claim 1 wherein the selected distance from the second end to the shoulder on the inside surface of each spring carrier is adjusted such that adjacent sleeves are completely overlapping at the shoulder on the inside surface when a selected spring deflection is less than the maximum deflection.

7. The method of claim 1 wherein each sleeve is at least partially coated with a friction-reducing coating.

8. A Belleville spring assembly comprising:

a plurality of spring carriers for carrying a plurality of Belleville springs, the springs having a thickness of the material, an inside diameter and a maximum deflection of the springs in the compressed state, wherein each spring carrier comprises:

a sleeve having an outside surface, an inside surface, a first end and a second end;

a shoulder on the inside surface disposed at a selected distance from the first end and separating a larger diameter inside surface intersecting the first end and a smaller diameter inside surface intersecting the second end; and a shoulder on the outside surface disposed at a selected distance from the second end and separating a smaller diameter outside surface intersecting the second end, the smaller diameter outside surface of an adjacent sleeve intersecting the second end being adapted to fit slidably the larger diameter inside surface intersecting the first end, and a larger diameter outside surface intersecting the first end, the larger diameter outside surface having a circumferential flange thereon, the flange being disposed at a selected distance from the first end, the larger diameter outside surface having a diameter adapted to fit the inside diameter of the Belleville springs; and wherein the plurality of Belleville springs are carried by the spring carriers.

9. The spring assembly of claim 8 further including a mandrel, the spring carriers being mounted on the mandrel.

10. The assembly of claim 8 wherein the selected distance from the first end to the shoulder on the inside surface of each spring carrier and the selected distance from the second end to the shoulder on the outside surface of each spring carrier are selected such that adjacent sleeves are approximately completely overlapping when the springs are at the maximum deflection in the compressed state.

11. The assembly of claim 8 wherein the width of the circumferential flange on the outside surface (w) of each spring carrier is approximately equal to c+l+2(d−t), where c is the axial distance between the shoulder on the outside surface and the shoulder on the inside surface, l is the initial overlap of adjacent sleeves, d is the maximum deflection of the springs and t is the thickness of the material of the springs.

12. The assembly of claim 8 wherein the selected distance from the first end to the shoulder on the inside surface of each spring carrier and the selected distance from the second end to the shoulder on the outside surface of each spring carrier are selected such that adjacent sleeves are completely overlapping when the spring deflection is less than the maximum deflection of the springs.

13. The assembly of claim 8 wherein the selected distance from the first end to the shoulder on the outside surface of each spring carrier is adjusted such that adjacent sleeves are completely overlapping at the shoulder on the outside surface when a selected spring deflection is less than the maximum deflection.

14. The assembly of claim 8 wherein the selected distance from the second end to the shoulder on the inside surface of each spring carrier is adjusted such that adjacent sleeves are completely overlapping at the shoulder on the inside surface when a selected spring deflection is less than the maximum deflection.

15. The assembly of claim 8 wherein each sleeve is at least partially coated with a friction-reducing coating.

16. A method for providing a stack of Belleville springs, comprising:

providing a plurality of Belleville springs, the springs having a thickness of the material, an inside diameter and a maximum deflection of the springs in the compressed state;

providing a plurality of sleeves, the sleeves having an outside surface, an inside surface, a first end and a second end, a shoulder on the inside surface disposed at a selected distance from the first end and separating a larger diameter inside surface intersecting the first end and a smaller diameter inside surface intersecting the second end, a shoulder on the outside surface disposed at a selected distance from the second end and separating a smaller diameter outside surface intersecting the second end, the smaller diameter outside surface intersecting the second end being adapted to fit slidably the larger diameter inside surface of an adjacent sleeve intersecting the first end, and a larger diameter outside surface intersecting the first end, the larger diameter outside surface having a circumferential flange thereon, the flange being disposed at a selected distance from the first end, the larger diameter outside surface having a diameter adapted to fit the inside diameter of the Belleville springs;

placing the sleeves such that the first end of one sleeve overlaps the second end of another sleeve, forming a stack, such that the sleeves form a structure sufficiently rigid to prevent buckling of the stack.

\* \* \* \* \*